Patented Feb. 12, 1935

1,990,985

UNITED STATES PATENT OFFICE 1,990,985

PHENOLIC CONDENSATION PRODUCT

Ewald Fonrobert and Fritz Lemmer, Wiesbaden, Germany, assignors to The Resinous Products & Chemical Company, Philadelphia, Pa.

No Drawing. Application December 18, 1930, Serial No. 503,229. In Germany September 19, 1930

10 Claims. (Cl. 260—4)

It is known that the condensation of phenols with carbonyl compounds, more especially with formaldehyde, yields synthetic resins which, with or without the use of pressure, go over in more or less time, into an insoluble and infusible state. Most of these so-called "hardening phenol condensation products" dissolve only in high percentage alcohol or in other purely alcoholic or ester-type organic solvents. They are in general insoluble in water or aqueous alcohol. Only the phenol-tri alcohol described in German Patent 536,791, Examples 1 and 3, show some tendency toward water solubility which is however still limited. Either small quantities of alkali must be used in its preparation to confer water solubility or else the preparation must be extremely rapidly and carefully made. Upon standing for a short time in the air, in high dilution or upon the addition of salts or other coagulating agents, the alcohol precipitates out and forms two layers.

It is furthermore known that the phenolic hydroxyl group of synthetic resins may be neutralized by treating the resins with halogen compounds of the type of alkyl-, aryl-, aralkyl-, acyl-, carboxyl alkyl-, and similar bodies. In no place however, up to the present time, is there described the use of halogenated alcohols, and furthermore all of the previously prepared resins are only soluble in organic liquids. A solubility in water or aqueous alcohol has never been reported for any of these previous synthetic resin derivatives.

It has now been found that it is possible to prepare hardening synthetic resins having a still greater number of hydroxyl groups and a still greater solubility in water or in aqueous liquids than has previously been possible or known; by bringing the phenol group of phenol-alcohols into reaction with compounds which themselves still contain free aliphatic hydroxyl groups, notably with alcohols which contain halogen, or with partially halogenated polyhydric alcohols.

The solubility of such products increases the more with the greater the number of alcoholic groups introduced into the molecule, in this manner. One obtains in fact products which are completely miscible with water without precipitating out and which will also withstand prolonged boiling in water at 100° C.

These new products are not only valuable because of their new solubility and because the use of expensive solvents such as high percentage alcohol may be lessened, but because they show an unexpected rapid and good hardening action which does not correspond to the increase in hydroxyl groups. They may be used for preparing plastic masses of every kind, for impregnating, insulating, and coating wherever alcohol soluble hardening phenol resins have been heretofore used.

For all of these purposes one may work in aqueous solutions or with very dilute alcohol solutions and thereby save costs and at the same time cut down the fire hazard of the various operations. Whereas the previously described water soluble phenol alcohols still contain appreciable quantities of excess formaldehyde, the new synthetic resins are free from uncombined formaldehyde and therefore in many ways better adapted for use because they do not so readily undergo further aldehyde reactions. Finally, the new products show a greater resistance to oxidation and to light because of the neutralization of the phenol group. This makes them especially adaptable for conversion into oil-soluble synthetic resins. It could not have been predicted that compounds of this superhydroxylated type would possess such good and technically valuable properties and be so simply prepared.

The preparation of these new synthetic resins is analogous to that used with other materials in organic chemistry and consists in treating the metal salts of the synthetic resins with the corresponding halogen compounds. For example, the phenol alcohols which are capable of being hardened are dissolved in alcoholic sodium hydroxide solution and heated with the partially halogenated alcohol. Condensation occurs with splitting out of sodium chloride.

The condensation products remain dissolved whereas the salt which is formed separates out and may be removed by filtration. The new purified resins are obtained by removing the alcohol in vacuo.

They form thinly liquid, viscous, or resinous masses which upon heating, lose their solubility more or less rapidly and form rubber-like or hard, somewhat elastic final product.

Chemically, the new resins represent what appear to be arylhydroxyalkylethers. By the use of pure reagents it is possible in several cases to obtain these as well defined chemically pure bodies, the analyses of which indicate that the assumed constitution is probably correct. It is of course obvious that it is also possible for still other reactions to occur at the same time.

The phenol alcohols which may be used are all those derivatives of monohydric or polyhydric phenols either mononuclear or polynuclear which still contain in addition to the phenolic hydroxyl group, one or more alcoholic hydroxyl groups. They may be used in the crude or in the purified form individually or as mixtures.

The partly halogenated, polyhydric, aliphatic alcohols which may be used as second component in this new process, are understood to be all polyhydric aliphatic alcohols such as for example, glycol, glycerol, and so forth, in which one or more hydroxyl groups are replaced by halogen, so that at least one alcoholic hydroxyl group remains free. This halogenation can be incomplete or mixtures of various halogenated alcohols may be used.

The course of the reaction between the two components used is shown not only by the new properties of the resin obtained and by the separation of sodium chloride, but also by the fact that the use of non-halogenated alcohols leads to no visible reaction even when the components are boiled a similar length of time at the same temperature.

*Example 1*

168 parts cresol polyalcohol prepared by treating at 40° C., 1 mole para cresol with 2 moles formaldehyde in the presence of ⅕ mole of sodium hydroxide in aqueous solution are dissolved in 800 parts 5 percent alcoholic sodium hydroxide solution and then boiled under reflux for 4 hours with 110.5 parts of alpha-monochlorhydrine (exactly 1 mole). There separates 56.5 parts sodium chloride which is removed by filtration. Theoretically 58.5 parts sodium chloride should be formed. After removing the alcohol in vacuo at 14 mm. mercury pressure and at a temperature of 40° C. there are obtained 248 parts of a tough, resinous condensation product. This shows a residue at 150° C. of 75%; 2.7% ash and yields an acetyl derivative having a saponification number 503, whereas theoretically the acetylated condensation product should possess a saponification number equal to 502.2.

The condensation product is soluble in alcohol and water to form a clear solution. Upon highly diluting the aqueous solution it is reprecipitated. By heating at 200° C. the product gradually becomes rubbery and after 10 hours is hard and insoluble.

*Example 2*

69.6 parts dihydroxy-tetramethylol-diphenyl-dimethyl methane are dissolved in 440 parts 4% alcoholic sodium hydroxide and boiled under reflux 5 hours with 35.2 parts glycolchlorhydrine (10% more than the theoretically necessary quantity). 25 parts NaCl separate out which is removed by filtration. (Theoretically 25.6 parts should be formed.) After removing the alcohol in vacuo at 14 mm. mercury pressure and at a maximum temperature of 40° C., there is obtained 85 parts of a tough resin. This represents almost pure 4,4'(di-β-hydroxyethoxy)3,5,3'5' tetramethylol-diphenyl-dimethyl methane having the formula:

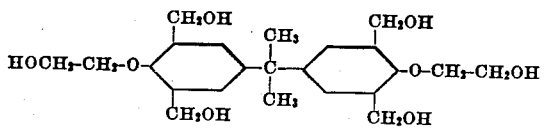

The yield is 97.5% of theoretical.

The product shows a residue at 150° C. of 77.8% and has an ash content of 1.52%. It is soluble in alcohol and water from which any traces of flocky material may be removed by filtration, to give a clear solution in all proportions. Only upon long standing does turbidity finally develop and a separation in two layers occur. By the addition of a very small quantity of alcohol the solution again becomes homogeneous. In ether, acetone, acetates, benzol and benzine, the product is more or less insoluble.

If a 50% aqueous solution of the resin is boiled for some time, turbidity will occur after 9–10 hours. When heated in the pure form, the product after about 15 minutes at 150° C. goes over into the insoluble, rubbery state. The hardened material is relatively elastic and insensitive towards water and other solvents.

Upon painting the aqueous solution upon glass the film becomes hazy during the drying, but by baking for 1 hour at 150° C. a clear very adherent film is obtained. It is resistant toward water, alkali, and solvents, and does not turn yellow even after 10 hours' exposure to the light of a quartz lamp.

Upon acetylation, it can be shown without doubt, that it possesses 6 hydroxyl groups capable of being acetylated, and therefore corresponds to the above composition. It is especially suitable as impregnating medium, for insulation and as a starting material for preparing oil-soluble synthetic resins.

*Example 3*

193 parts of crude dihydroxy-tetramethylol-diphenyl-dimethyl methane (prepared according to Example 1 of German Patent 494,778 by treating 1 mole of dihydroxy diphenyl dimethyl methane dissolved in the molecular quantity of a base with 4 moles of aqueous formaldehyde) are dissolved in 800 parts 10% alcoholic sodium hydroxide solution and heated with 65 parts dichlorhydrine (molecular amount).

The product is worked up as described herein in Examples 1 and 2. There is obtained 218 parts of a tough, turbid resin, which still contains some water and has an ash content of 0.5% and a residue at 150° C. of 56.1%.

The condensation product is soluble in pure alcohols as well as in alcohol highly diluted with water, and in benzyl alcohol. It is insoluble in ether, acetone, acetates, benzol, and benzine. Upon heating it very rapidly goes over to the rubbery, insoluble end product.

We claim:—

1. A method of preparing an artificial resin which comprises bringing into reaction metal salts of phenol methylols and polyhydric aliphatic alcohols part of whose hydroxy groups is replaced by halogen.

2. Method of preparing an artificial resin which comprises treating alkali metal salts of phenol methylols with polyhydric aliphatic alcohols part of whose hydroxyl groups is replaced by halogen.

3. Method of preparing an artificial resin as set forth in claim 1 which comprises dissolving phenol methylols in alcoholic alkali solution and heating the mixture with a partially halogenated alcohol.

4. Method of preparing an artificial resin which consists in heating together at reaction temperature, a mixture of dihydroxy-tetramethylol-diphenyl-dimethyl methane, alcoholic sodium hydroxide solution, and ethylene chlorhydrine.

5. As a new composition of matter a phenolmethylol in which the phenolic hydroxyl group is etherified by a hydroxyalkyl radicle, said composition being soluble in dilute alcohol.

6. A resinous compound constituted by the reaction product of a phenol polymethylol, an alkali metal hydroxide, and a polyhydric aliphatic alcohol part of whose hydroxyl groups is replaced by halogen.

7. A resinous condensation product of a metal phenate containing at least one nuclear methylol group, and a polyhydric aliphatic alcohol part of whose hydroxy groups is replaced by halogen.

8. A resinous condensation product of an alkali metal salt of a polycyclic phenol containing at least one nuclear methylol group and a polyhydric aliphatic alcohol part of whose hydroxyl groups is replaced by halogen.

9. As a new composition of matter a hydroxyalkyl ether of a phenolmethylol in which only the phenolic hydroxy group is etherified.

10. As new composition of matter 4,4'-(di-β-hydroxyethoxy-)-3,5,3',5'-tetramethylol-diphenyl-dimethyl methane, having the formula

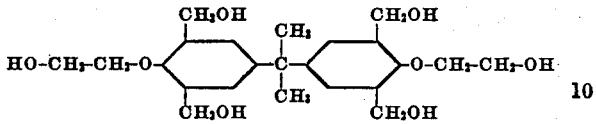

EWALD FONROBERT.
FRITZ LEMMER.